April 6, 1926.
W. T. HAYDEN
PORTABLE SPRAY PUMP
Filed August 14, 1925
1,579,316
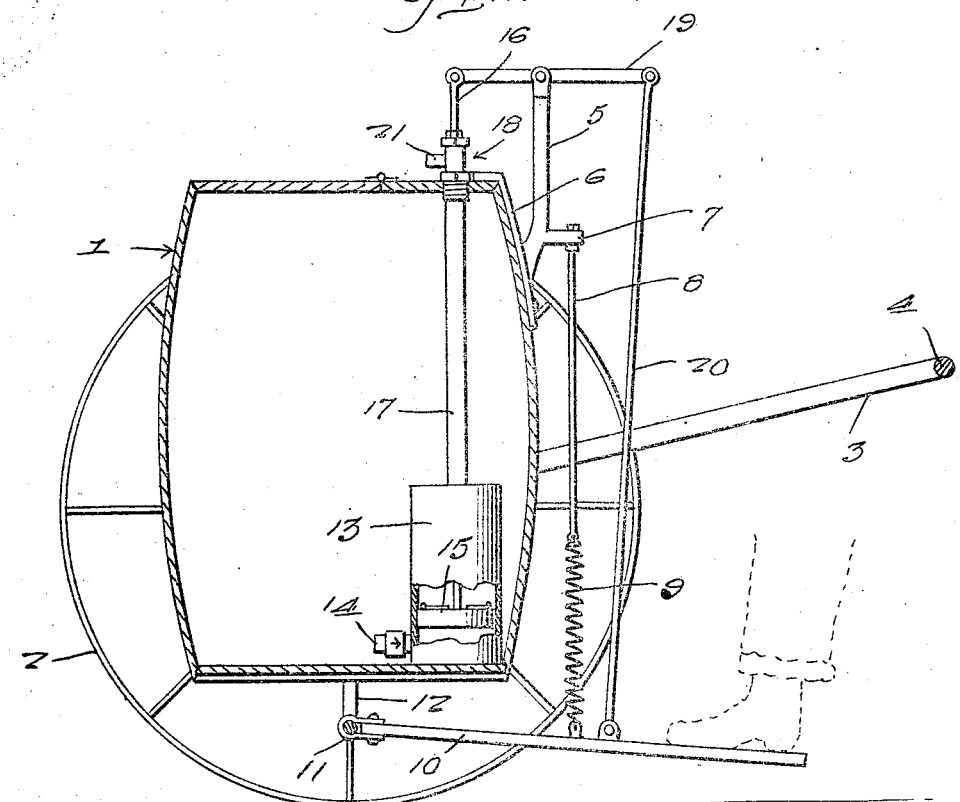
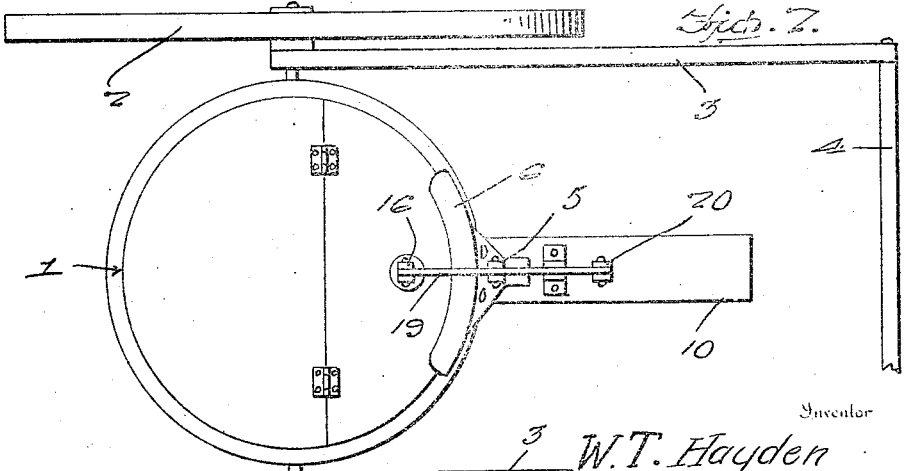
Inventor
W. T. Hayden Patented Apr. 6, 1926.

1,579,316

UNITED STATES PATENT OFFICE.

WILLIAM T. HAYDEN, OF SULLIVAN, INDIANA.

PORTABLE SPRAY PUMP.

Application filed August 14, 1925. Serial No. 50,296.

*To all whom it may concern:*

Be it known that I, WILLIAM T. HAYDEN, a citizen of the United States, residing at Sullivan, in the county of Sullivan and State of Indiana, have invented certain new and useful Improvements in a Portable Spray Pump, of which the following is a specification.

This invention relates to an improved portable spray pump which is highly desirable for use in orchards and the like for spraying fruit trees, plants, and the like with an insecticide fluid.

The principal object is to generally improve upon devices of this class by providing one of comparative simplicity and durability which is convenient to handle in moving it from place to place, easy to manipulate, and exceedingly practical in operation.

Briefly, the invention comprises a wheel supported barrel in which the insecticide fluid is contained, there being a novel pump arranged in this barrel and operating means supported from the barrel to be operated by a foot treadle for pumping the fluid out of the barrel.

In the drawing:—

Figure 1 is a view in section and elevation of a device constructed in accordance with the present invention.

Figure 2 is a top plan view of the same.

Referring to the drawings in detail, the reference character 1 designates a fluid tight barrel or equivalent container which is rockably supported from the cart wheels 2, side bars 3 are connected to a cross 4 in forming a substantially U-shaped handle by means of which the device is wheeled from place to place.

At the top of the barrel is an upstanding bracket 5 formed integral with an especially shaped attaching plate 6 fastened to the upper portion of the barrel. This bracket is provided with an outstanding lug 7 with which a depending rod 8 is connected, this rod carrying a coiled spring 9 which is connected to the intermediate portion of the foot pedal 10. This foot pedal is pivoted at 11 to a yoke 12 and is adapted for operating the pump.

The pump comprises a relatively large cylinder 13 arranged within the barrel and provided at the bottom with an intake 14. Slidable in the cylinder is a valve piston 15, the rod 16 of which extends upwardly through a casing 17. At the top of this casing an appropriate stuffing box 18 through and beyond which the rod 16 extends. A link 19 is pivoted intermediate its ends on the bracket 5 and pivotally connected at one end to the rod 16 and at its opposite end to an operating connection 20 between the link and the intermediate part of the aforesaid foot pedal 10. On one side of the stuffing box is a connection 21 for a suitable hose or the like (not shown). The hose will be of any appropriate length, and will be provided with a nozzle to be held in the hand of the walking attendant for spraying the trees and plants.

In practice, the barrel containing the fluid insecticide is wheeled from place to place, and whenever it is desired to eject a quantity of the fluid, the walking attendant or operator simply places his foot upon the pedal and forces it down. In so doing the piston is raised in the cylinder of the pump to eject a small quantity of the fluid. The principle of the operation of the pump is like that of any ordinary pump. When the foot is released from the pedal the pedal is lifted up by the coiled spring as is obvious, and in this way the pump is always charged for immediate operation.

It is thought that by carefully considering the description in connection with the drawings, persons familiar with structures of this kind will be able to obtain a clear understanding of the same. Therefore a more lengthy description is deemed unnecessary.

While the preferred embodiment of the invention has been shown and described, it is to be understood that minor changes coming within the field of invention claimed may be resorted to if desired.

Having thus described the invention, what I claim as new and desire to secure by Letters Patent is:—

1. A liquid spray of the class described comprising a wheel supported barrel, a pump cylinder in said barrel, a casing connected with said cylinder and extending upwardly to the top of the barrel, an intake connected with said cylinder, a piston movable in said cylinder, a rod connected with said piston and extending upwardly through the cylinder and casing, a pivotally mounted foot pedal on the barrel, and an operating connection between the pedal and piston rod.

2. In a structure of the class described, a barrel, a bracket, a mounting for said bracket connected with said barrel, a link pivoted between its ends on said bracket, a pedal pivotally mounted on the barrel and disposed in parallelism with the link, an operating connection between the link and intermediate part of the pedal, spring means between the pedal and the bracket for automatically returning the pedal to ineffective position, and a pump in said barrel including a piston rod connected with the opposite end of said link.

In testimony whereof I affix my signature.

WILLIAM T. HAYDEN.